(12) United States Patent
Bouzidi

(10) Patent No.: US 7,180,998 B2
(45) Date of Patent: Feb. 20, 2007

(54) REGULATOR FOR IMPEDANCE BALANCE OF A TRANSMISSION WIRE PAIR

(75) Inventor: Jean-Pierre Acéne Bouzidi, Lannion (FR)

(73) Assignee: Alcatel, Paris (FR)

( * ) Notice: Subject to any disclaimer, the term of this patent is extended or adjusted under 35 U.S.C. 154(b) by 256 days.

(21) Appl. No.: 11/002,202

(22) Filed: Dec. 3, 2004

(65) Prior Publication Data
US 2005/0142953 A1    Jun. 30, 2005

(30) Foreign Application Priority Data
Dec. 26, 2003    (EP)    .................................. 03293356

(51) Int. Cl.
*H04M 9/00* (2006.01)
*H04M 7/04* (2006.01)

(52) U.S. Cl. .......................... 379/394; 379/398; 333/4; 333/18; 333/25; 333/26; 333/28 R

(58) Field of Classification Search ................ 379/340, 379/394–398, 403; 333/4–5, 18, 25–26, 333/28 R–140
See application file for complete search history.

(56) References Cited

U.S. PATENT DOCUMENTS 4,387,273 A * 6/1983 Chea, Jr. .................... 379/398
5,526,425 A * 6/1996 Meyer et al. ................ 379/402
5,596,637 A * 1/1997 Pasetti et al. ........... 379/399.02

FOREIGN PATENT DOCUMENTS

EP    0 467 163 A1    1/1992

* cited by examiner

*Primary Examiner*—Fan Tsang
*Assistant Examiner*—Ramnandan Singh
(74) *Attorney, Agent, or Firm*—Sughrue Mion, PLLC

(57) ABSTRACT

The present invention relates to a regulator for impedance balancing of first (104) and second wires (106) of a transmission wire pair having respective first and second impedances, the regular comprising:
 means (108) for determining a first signal (116) being representative of an average of square value of a first current (i1) flowing through the first wire,
 means (118) for determining a second signal (126) being representative of the average of square value of a second current (i2) flowing through the second wire,
 means (128, 130) for determining first and second coefficients (k1, k2) on the basis of the first and second signals,
 first feedback means (132, 134, 136) for regulating the first current on the basis of the first coefficient,
 second feedback means (138, 140, 142) for regulating the second current on the basis of the second coefficient.

7 Claims, 1 Drawing Sheet

REGULATOR FOR IMPEDANCE BALANCE OF A TRANSMISSION WIRE PAIR

FIELD OF THE INVENTION

The present invention generally relates to the field of telephony, and more particularly without limitation, to impedance balancing of a transmission wire pair connected to a central office and a subscriber device.

BACKGROUND AND PRIOR ART

Twisted pairs of copper telephone wire, commonly referred to as twisted pairs, have been in existence since the late nineteenth century when Alexander Graham Bell first invented them. In fact, most of the transmission lines in a typical telephone network, commonly referred to as the telephone loop plant, are twisted pairs. Although much of the loop plant has been or is currently being upgraded with optical fiber, it is expected that twisted pair technology will remain in place for many years due to the high cost of upgrading and due to the ability to achieve high transmission rates over twisted pairs.

U.S. Pat. No. 3,989,902 shows a regulator which can be used in combination with equipment connected to a telephone type line. The regulator senses the amount of direct current being passed by the line and adjusts its internal AC impedance in inverse relationship thereto. This will shunt alternating current signals more severely when connected to short line loops having relatively small insertion loss, protecting a central office from excessive signal amplitudes.

U.S. Pat. No. 6,477,212 shows an apparatus for reducing local area and broad area interference in a twisted pair transmission system. The apparatus includes a detection device, such as an antenna, for example, for detecting electromagnetic interference coupled into a twisted pair line, a sampling/scaling device which samples and scales the detected signal, and a combiner device which combines a signal correction component with the signal received over the twisted pair by a differential receiver. The sampling/scaling device includes an analog-to-digital converter (ADC) which converts the detected analog signal into a digital signal and a digital signal processor, which receives the digital signal from the ADC and processes the signal to generate a correction signal. The correction signal is then subtracted from the signal received by the differential receiver.

SUMMARY OF THE INVENTION

The present invention provides for a regulator for impedance balancing of a transmission wire pair connected to a central office and subscriber device. The regulator determines the average of the square values of the currents flowing through the transmission wire pair. The average of the square values are subtracted from each other in order to determine coefficients for regulating the currents.

This has the advantage that impedance balancing can be performed with respect to both the input impedances of the central office as well as the wire impedances of the transmission wire pair. As a consequence a common mode signal component is reduced as well as crosstalk. Further the input impedances of the central office can have relatively large tolerances as those tolerances are compensated by the regulator in accordance with the present invention.

In accordance with a preferred embodiment of the invention the regulator has separate feedback loops for the currents of the transmission wire pair. Each feedback loop has a multiplier for multiplication of a value that corresponds to the sum of the voltage levels of the two wire pairs. The resulting control signal is subtracted from the respective current.

It is to be noted that the invention can be used for any transmission method, such as analog telephone, ISDN, HDSL, or others.

BRIEF DESCRIPTION OF THE DRAWING

In the following a preferred embodiment of the present invention will be described by way of example only by making reference to the drawing in which.

DETAILED DESCRIPTION

Figure 1:
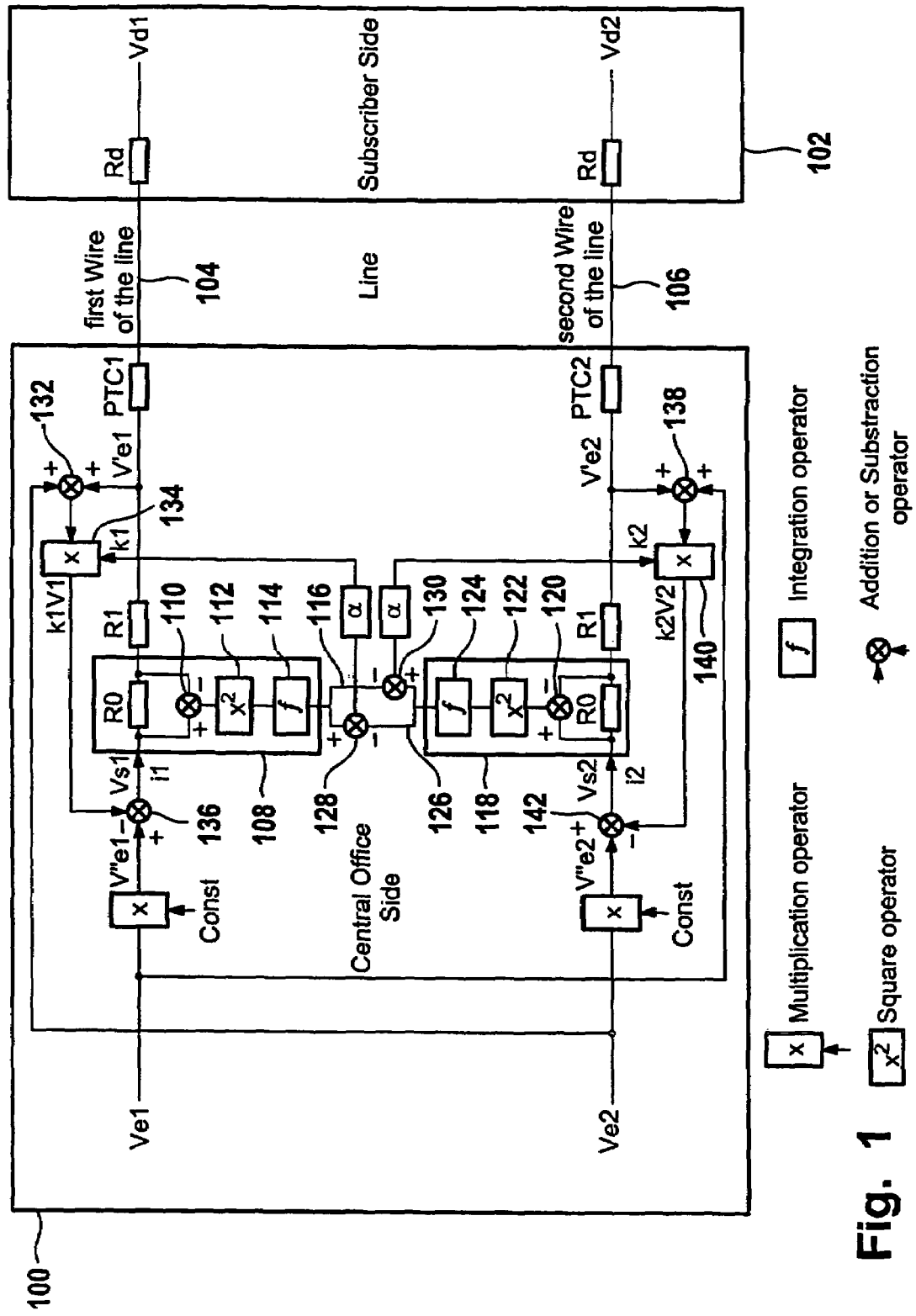
FIG. 1 is a block diagram of a preferred embodiment of a central office of the invention.

FIG. 1 shows central office 100 of a telephone network. Telephone 102 or an equivalent end user device is connected to central office 100 by means of wires 104 and 106.

Current i1 flows through wire 104. The average of square value of current i1 is determined by signal processing component 108. Signal processing component 108 has subtracter 110, square operator 112 and integration operator 114 in order to provide a signal at its output 116 that represents the average of square value of current i1.

Further central office 100 has signal processing component 118 for determination of a signal that represents the average of square value of current i2 that flows through wire 106. Signal processing component 118 has subtracter 120, square operator 122, and integration operator 124 to provide a signal that represents the average of square value of current i2 at its output 126. In a practical implementation the signal processing components 118 and 126 can be implemented by separate physical components or by a single processor.

The output signal of output 116 is substracted from the output signal of output 126 by means of subtracter 128. The result of the substraction is a coefficient k1. Likewise subtracter 130 substracts the signal of output 126 from the signal of output 116 to provide coefficient k2. In addition the respective outputs of subtracters 128 and 138 can be multiplied by means of a common factor a to provide the coefficients k1 and k2, respectively.

Adder 132 is coupled to wire 106 for sensing of voltage Ve2 and to wire 104 for sensing of voltage V'e1. Adder 132 has its output coupled to input of multiplier 134. Multiplier 134 multiplies the output of adder 132 by k1. Subtracter 136 subtracts the output of multiplier 134 from the voltage V"e1; V"e1 is the result of the multiplication of Ve1 with a constant coefficient. This way a feedback loop for regulating current i1 is formed.

A corresponding feedback loop for current i2 is formed by respective adder 138, multiplier 140 and subtracter 142. As a result of the control of the currents i1 and i2 the combined impedances of input impedance PTC1 of central office 100, impedance of wire 104, and impedance Rd of subscriber device 102 on one side and the combined impedances of PTC2, impedance of wire 106, and Rd on the other side are balanced. As a consequence currents i1 and i2 have substantially the same value and opposite phase at all times. This has a number of advantages including common mode rejection and suppression of crosstalk.

As regards the mathematical proof reference is made to mathematical appendix 1.

Appendix 1

The averages of the square of the voltages taken on resistors (R0) located at the outputs of the access interface are measured. The averages of the two voltage are subtracted and the results after an amplification (k1 and k2) are delivered to a multiplier which is in charge to multiply the averages (k1 and k2) with a linear combination of the signal present on the wire of the line and the signal sent by the central office. The signals outgoing (k1V1 and k2V2) are subtracted with the respective input signal.

The amount of k1 and k2 are defined by the difference between the impedance PTC2 and PTC1 (and by extension with any difference impedance on the wire of the line).

The behavior of the circuit (FIG. 1) can be understood as follows:

If ohmic value of PTC2 is lower than PTC1 then i2 is greater than i1

Calling I1 and I2 the RMS value respectively of current i1 and i2

If i2 is greater than i1 then I2 is greater than I1, that involves an decrease of k1 (an increase of k2)

If k1 decreases then k1V1 decreases

If k1V1 decreases, Vs1 increases then

Finally if Vs1 increases i1 increases and tends towards i2

In the same manner with the second half loop, i2 decreases, and tends towards i1.

The loop tends to cancel the difference between i1 and i2.

Note: On FIG. 1 the function of multiplication of Ve1 and Ve2 by a constant (Const) allows to reduce the difference of the time transfer (delay) with k1V1 and k2V2 signals.

This first approach could be completed by the equation of k1 and k2. By this way we verify that the final value of k1 and k2 tend toward the equalization of the impedance and the circuit improves as foreseen, the symetrical characteristic. From FIG. 1, in taking: $Vd1=Vd+Vmc$, $Ve1=Ve$ $Vd2=-Vd+Vmc$, $Ve2=-Ve$ We find: $i1=(Ve-Vd)K1-Vmc\,K1$ (e)

$I2=-(Ve-Vd)K2-Vmc\,K2$ (ee)

With $K1=(1+k1)/((R0+R1+PTC1+Rd)+k1(PTC1+Rd))$ (i)

$K2=(1+k2)/((R0+R1+PTC2+Rd)+k2(PTC2+Rd))$ (ii)

If $K1=K2$, then the differential (Ve−Vd) part of i1 is the opposite of the respective part of i2 and the common part of i1 is equal of the respective part of i2.

By the circuit $k1=-k2$, in taking $k1=k$, $k2=-k$, to get $K1=K2$, the following equation must be verified $(1-k^2)(PTC2-PTC1)+2k\,(R0+R1)=0$ This equation has two solutions but only one is (the shortest) reached by the loop of the circuit.

Now we can verify that K1 tends towards K2 (K1=K2).

In first estimation $k=\alpha\,(I1-I2)$ then by substituting k1 by $\alpha\,(I1-I2)$ and k2 by $-\alpha\,(I1-I2)$ in equation (i) and (ii) and from equation (e) and (ee) the RMS value of i1 and i2 are equal to:

$I1=VEFF(1+\alpha(I1-I2))/((R0+R1+PTC1+Rd)+\alpha(I1-I2)(PTC1+Rd))$ (j)

$I2=VEFF(1-\alpha(I1-I2))/((R0+R1+PTC2+Rd)-\alpha(I1-I2)(PTC2+Rd))$ (jj)

VEFF means the RMS value of Ve, Vd and Vmc

Finally from j) and (jj) we find:

lim I1=I2 and lim I2=I1 when $\alpha$ tends towards infini.

The loop tends to equalize the RMS value of i1 and i2 and therefore to equalize the differential part and common part of i1 and i2.

LIST OF REFERENCE NUMERALS

100 Control Office
102 Telephone
104 Wire
106 Wire
108 Signal Processing Component
110 Subtracter
112 Square Operator
114 Integration Operator
116 Output of Signal Processing Component
118 Signal Processing Component
120 Subtracter
122 Square Operator
124 Information Operator
126 Output of Signal Processing Component
128 Subtracter
130 Subtracter
132 Adder
134 Multiplier
136 Subtracter
138 Adder
140 Multiplier
142 Subtracter

The invention claimed is:

1. A regulator for impedance balancing of first (104) and second wires (106) of a transmission wire pair having respective first and second impedances, the regulator comprising:

means (108) for determining a first signal (116) being representative of an average of the square value of a first current (i1) flowing through the first wire, means (118) for determining a second signal (126) being representative of the average of the square value of a second current (i2) flowing through the second wire, means (128, 130) for determining first and second coefficients (k1, k2) on the basis of the first and second signals, first feedback means (132, 134, 136) for regulating the first current on the basis of the first coefficient, second feedback means (138, 140, 142) for regulating the second current on the basis of the second coefficient.

2. The regulator of claim 1, the first feedback means having a first adder (132) for providing a first control signal on the basis of a voltage level of the first wire (V'e1) and a voltage level of the second wire (Ve2), a first multiplier (134) for multiplication of the first control signal with the first coefficient (k1), and a first subtracter (136) for subtracting the multiplied first control signal, and the second feedback means having a second adder (138) for providing a second control signal on the basis of a voltage level of the first wire (Ve1) and voltage level of the second wire (V'e2), and a second multiplier (140) for multiplication of the second control signal with the second coefficient (k2), and a second subtracter (142) for subtracting the multiplied second control signal.

3. A central office for a telephone network, the central office having first and second input impedances (PTC1, PTC2) for coupling of first and second wires of a transmission wire pair, the first and second wires having respective first and second impedances, the central office comprising a regulator for balancing of the combined first impedance and first input impedance and the combined second impedance and second input impedance, the regulator having:

means (108) for determining a first signal (116) being representative of an average of the square value of a first current (i1) flowing through the first wire, means (118) for determining a second signal (126) being representative of the average of the square value of a second current (i2) flowing through the second wire, means (128, 130) for determining first and second coefficients (k1, k2) on the basis of the first and second signals, first feedback means (132, 134, 136) for regulating the first current on the basis of the first coefficient, second feedback means (138, 140, 142) for regulating the second current on the basis of the second coefficient.

4. The central office of claim 3, the first feedback means having a first adder (132) for providing a first control signal on the basis of a voltage level of the first wire (V'e1) and a voltage level of the second wire (Ve2), a first multiplier (134) for multiplication of the first control signal with the first coefficient (k1), and a first subtracter (136) for subtracting the multiplied first control signal, and the second feedback means having a second adder (138) for providing a second control signal on the basis of a voltage level of the first wire (Ve1) and voltage level of the second wire (V'e2), and a second multiplier (140) for multiplication of the second control signal with the second coefficient (k2), and a second subtracter (142) for subtracting the multiplied second control signal.

5. A method of regulating first and second currents flowing through respective first and second wires of a telephone wire pair, the method comprising:

determining of a first signal being representative of the average of the square value of the first current and the second signal being representative of the average of the square value of the second current, determining of first and second coefficients on the basis of the first and second signals, regulating the first current on the basis of the first coefficient and regulating the second current on the basis of the second coefficient.

6. The method of claim 5 wherein the regulation is performed by:

determining first and second control signals on the basis of a voltage level of the first wire and voltage level of the second wire, multiplying of the first control signal with the first coefficient and multiplying of the second control signal with the second coefficient, subtracting of the multiplied first control signal from the first current and subtracting of the multiplied second control signal from the second current.

7. The method of claim 5, wherein the first coefficient (k1) is obtained by subtracting the second signal from the first signal and wherein the second coefficient (k2) is obtained by subtracting the first signal from the second signal.

\* \* \* \* \*